United States Patent
Parkes et al.

(10) Patent No.: US 9,482,766 B2
(45) Date of Patent: Nov. 1, 2016

(54) TIME-EFFICIENT TESTS TO DETECT AIR GUN FAULTS

(71) Applicant: PGS Geophysical AS, Lysaker (NO)

(72) Inventors: Gregg Parkes, Wiltshire (GB); Stian Hegna, Hovik (NO); Francis Drossaert, London (GB)

(73) Assignee: PGS Geophysical AS, Oslo (NO)

(*) Notice: Subject to any disclaimer, the term of this patent is extended or adjusted under 35 U.S.C. 154(b) by 363 days.

(21) Appl. No.: 14/076,044

(22) Filed: Nov. 8, 2013

(65) Prior Publication Data

US 2014/0340983 A1 Nov. 20, 2014

Related U.S. Application Data

(60) Provisional application No. 61/823,902, filed on May 15, 2013.

(51) Int. Cl.
*G01V 1/137* (2006.01)
*G01V 1/38* (2006.01)
*G01V 13/00* (2006.01)

(52) U.S. Cl.
CPC ............. *G01V 1/137* (2013.01); *G01V 1/3861* (2013.01); *G01V 13/00* (2013.01); *G01V 2200/14* (2013.01)

(58) Field of Classification Search
CPC ..... G01V 1/137; G01V 1/3861; G01V 13/00
USPC .......................................................... 367/15
See application file for complete search history.

(56) References Cited

U.S. PATENT DOCUMENTS

| 3,602,878 | A | * | 8/1971 | Sullivan | G01V 1/006 367/144 |
|---|---|---|---|---|---|
| 4,476,553 | A | | 10/1984 | Ziolkowski et al. | |
| 4,739,858 | A | * | 4/1988 | Dragoset, Jr. | G01V 1/006 181/115 |
| 4,868,794 | A | | 9/1989 | Ziolkowski et al. | |
| 7,218,572 | B2 | | 5/2007 | Parkes | |
| 7,466,630 | B2 | | 12/2008 | Vaage | |
| 7,518,953 | B2 | | 4/2009 | Hegna et al. | |
| 8,427,901 | B2 | | 4/2013 | Lunde et al. | |
| 2003/0202423 | A1 | * | 10/2003 | Clayton | G01V 1/006 367/13 |
| 2004/0228214 | A1 | * | 11/2004 | Tulett | G01V 1/3861 367/15 |
| 2010/0149911 | A1 | * | 6/2010 | Hopperstad | G01V 1/006 367/23 |
| 2014/0034412 | A1 | * | 2/2014 | Ni | G01V 1/08 181/107 |

(Continued)

FOREIGN PATENT DOCUMENTS

| EP | 2648021 A1 | 10/2013 |
|---|---|---|
| WO | 2014006212 A1 | 7/2014 |

OTHER PUBLICATIONS

Stian Hegna and Gregg Parkes, "The low frequency output of marine air-gun arrays," SEG San Antonio 2011 Annual Meeting, pp. 77-81.

(Continued)

*Primary Examiner* — James Hulka
*Assistant Examiner* — John T Nolan
(74) *Attorney, Agent, or Firm* — Meyertons, Hood, Kivlin, Kowert & Goetzel, P.C.

(57) ABSTRACT

Techniques are disclosed relating to testing of seismic air guns, for example via bubble tests. According to some embodiments of these techniques, a firing sequence for testing the air guns may be determined that reduces the amount of interaction between firings. Further, firing time delays may also be determined in order to further reduce the interactions. Accordingly, a test of an array of air guns may be completed relatively quickly.

21 Claims, 13 Drawing Sheets

(56) References Cited

U.S. PATENT DOCUMENTS

2014/0297190 A1* 10/2014 Svay .................. G01V 13/00
702/16
2015/0185343 A1* 7/2015 Tonchia ............... G01V 1/3861
367/21

OTHER PUBLICATIONS

R.M. Laws, et al., "The Physics of Marine Seismic Sources: Interaction, Interference, and the Conservation of Energy," SEG Technical Program Expanded Abstracts 1986, pp. 374-375.

G.E. Parkes, et al. "The Signature of an Air Gun Array: Computation from Near-Field Measurements Including interactions—Practical Considerations," SEG Technical Program Expanded Abstracts 1982, pp. 183-185.

G.E. Parkes, et al. "The Signature of an Air Gun Array: Computation from Near-Field Measurements Including interactions—Practical Considerations," Geophysics vol. 48 No. 2, Feb. 1984, pp. 105-111.

A. Ziolkowski, et al, "The signature of an air gun array: Computation from near-field measurements including interactions," Geophysics vol. 47 No. 10, Oct. 1982, pp. 1413-1421.

UK Search Report issued in patent application No. GB1408512.0, mailed Oct. 21, 2014, 4 pages.

* cited by examiner

TIME-EFFICIENT TESTS TO DETECT AIR GUN FAULTS

CROSS-REFERENCE TO RELATED APPLICATIONS

This application claims priority to U.S. Provisional Application No. 61/823,902, filed May 15, 2013, which is incorporated by reference herein in its entirety.

BACKGROUND

Geophysical surveys are often used for oil and gas exploration in geophysical formations, which may be located below marine environments. Various types of signal sources and sensors may be used in different types of geophysical surveys. For example, seismic geophysical surveys are based on the use of acoustic waves. In such a survey, a vessel may tow an acoustic source (e.g., an air gun or a marine vibrator) and a plurality of streamers along which a number of sensors (e.g., pressure sensors such as hydrophones, and/or particle velocity sensors such as accelerometers) are located. Acoustic waves generated by the source may then be transmitted into the earth's crust and then reflected back and captured at the sensors. Acoustic waves received during a marine seismic survey may be analyzed to locate hydrocarbon-bearing geological structures, and thus determine where deposits of oil and natural gas may be located.

During the course of surveying, the acoustic sources may develop various types of mechanical problems. For example, sealing washers may degrade with time, leading to air-leakage into the water, which may change the acoustic output from the air gun in an undesirable way. Further, air guns may simply fail during surveying. Generally, the only production tests currently done to check for air gun faults are "bubble tests." As discussed in more detail below, a bubble test typically includes actuating an air gun and measuring various parameters of the response. Typically, the measuring may be performed via an air gun hydrophone located proximate to the actuated air gun.

The current bubble test methodology is generally time-consuming, typically taking well over an hour, and therefore costly. Accordingly, these bubble tests are usually only done occasionally. Furthermore, bubble tests, as done today, are primarily used to verify air gun volumes (occasionally mistakes can be made when building the array, such that the actual volumes built into the array can be different than those specified), rather than to prevent failures before they occur. According to this disclosure, frequent bubble tests (e.g., every survey line) are possible at minimal cost. This data may allow the performance of the air guns to be monitored, which may prevent air gun failures and thus reduce downtime caused by failing air guns. Some embodiments of this disclosure are extremely efficient and can be carried out on the timescale of one shot record or a few shot records. A "shot record" is defined as the time extending from the actuation of an air gun to the end of recoding of data for that actuation. Typically, a shot record may begin concurrently with the actuation of an air gun, or it may in some embodiments begin slightly before the firing of the air gun—for example, about 50 milliseconds before the firing of the air gun. The shot record typically ends when sufficient time has elapsed such that the desired data has been captured.

The current practice in a bubble test is to fire one air gun per shot record (typically several seconds long) to ensure that interaction between the air gun signals does not occur. A typical length for a shot record in some embodiments is about 10 seconds. There are two main factors that determine this length. Firstly, it is typically desirable for it to be greater than the time it takes for the acoustic energy to travel from the source, through the earth to the deepest point of interest in the earth, and then back to the receiver array. Secondly, for sources such as the air gun, the shot record may advantageously be greater than the time it takes to re-charge the air in the sources. Since the shot records are typically of a similar length during a bubble test, the full bubble test for the array (or for two arrays in "flip-flop" shooting) can thus last several hours, during which normal seismic operations cannot take place. The main purpose of the bubble test is to determine that the actual air gun volumes are indeed the same as their nominal volumes. However, because the bubble test takes so long, it is typically carried out very rarely—for example, before the start of a survey and perhaps a few times during the survey.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Figure 1:
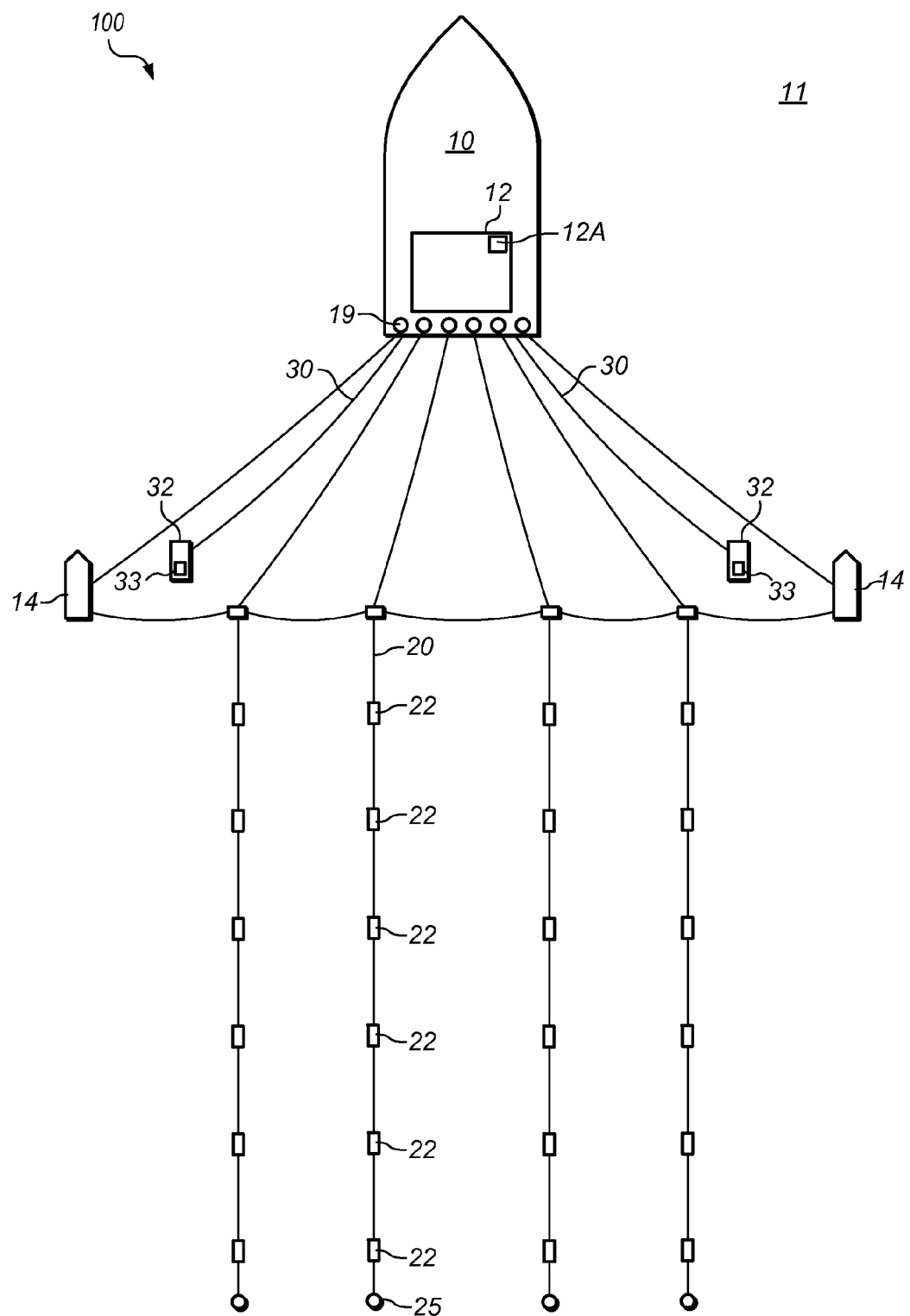
FIG. 1 shows a schematic of an embodiment of a marine surveying system.

Turning now to FIG. 1, a block diagram illustrating one embodiment of a geophysical survey system 100 is shown. In the illustrated embodiment, system 100 includes vessel 10, air gun arrays 32, paravanes 14, and streamers 20.

Vessel 10 may be configured to move along the surface of body of water 11 such as a lake or an ocean. In the illustrated embodiment, vessel 10 tows streamers 20, air gun arrays 32, and paravanes 14. As shown, streamers 20 may include various geophysical sensors 22 and tail buoys 25. In other embodiments, streamers 20 may be towed by a second vessel (not shown), rather than vessel 10. Vessel 10 may include equipment, shown generally at 12 and for convenience collectively referred to as "survey equipment." Survey equipment 12 may include devices such as a data recording unit (not shown separately) for making a record with respect to time of signals generated by various sensors in the acquisition system. Survey equipment 12 may also include navigation equipment (not shown separately), which may be configured to control, determine, and record, at selected times, the geodetic positions of: vessel 10, each of a plurality of geophysical sensors 22 disposed at spaced-apart locations on streamers 20, and/or air gun arrays 32. Geodetic position may be determined using various devices, including global navigation satellite systems such as the global positioning system (GPS), for example. In the illustrated embodiment, vessel 10 includes geodetic positioning device 12A, and air gun arrays 32 respectively include geodetic positioning devices 33. Survey equipment 12 may further include equipment (not shown separately) for operating (e.g., actuating and/or maneuvering) air gun arrays 32. For example, the equipment for operating air gun arrays 32 may be implemented as a dedicated source controller, a general purpose computer including non-transitory computer-readable media, or various other implementations. Any of these implementations may be referred to as an "air gun control apparatus" in various embodiments. This equipment may be coupled to the air guns via an air gun interface, which may include any circuitry or hardware operable to couple the air gun control apparatus to one or more air guns, such as air gun cable 30. For this purpose, various types of communications media, such as electrical wiring, fiber optics, etc. may also be employed. This equipment may also be coupled to the navigation equipment to allow precise and automatic firing of the seismic source at precise positions, which are normally equally spaced. Alternatively or in addition, various aspects of this disclosure may be implemented via systems not located on vessel 10. For example, certain portions of a calculation in accordance with this disclosure may be performed elsewhere.

Air gun arrays 32 may include one or more of any type of air gun known in the art. In some embodiments, arrays of air guns may be further divided into a plurality of sub-arrays. Each sub-array may then be divided into a plurality of air gun positions. Each air gun position may include one or more air guns. The use of more than one air gun at a given air gun position may be advantageous for purposes of redundancy, and/or to obtain a larger effective air gun volume than is practical with a single air gun, and or for other purposes.

In various embodiments, a survey system may include any appropriate number of towed air gun arrays 32. Air gun arrays 32 may be towed at any lateral position behind vessel 10, including essentially directly behind vessel 10 (i.e., along the centerline), distributed equally or unequally on either side of the centerline behind vessel 10, or only to one side of the centerline. In the embodiment illustrated in FIG. 1, air gun arrays 32 are distributed equally on either side of the centerline, and each is coupled to vessel 10 at one end through winches 19 or similar spooling devices that enable changing the deployed length of each air gun cable 30.

Geophysical sensors 22 on streamers 20 may be any type of seismic sensor known in the art. Non-limiting examples of such sensors may include particle-motion-responsive seismic sensors such as geophones and accelerometers, pressure-responsive seismic sensors, pressure-time-gradient-responsive seismic sensors, or combinations of the foregoing. In various implementations of the disclosure, geophysical sensors 22 may measure, for example, seismic energy from various structures in the Earth's subsurface below the bottom of body of water 11 in response to energy imparted into the subsurface by one or more of air gun arrays 32. Seismic energy, for example, may originate from air gun arrays 32, or an array of such sources, or a sub-array of such sources, deployed in body of water 11 and towed by vessel 10. Although not shown in FIG. 1, sensors 22 may be located on nodes or cables located or secured near or on the seafloor.

In the survey system shown in FIG. 1, vessel 10 tows four sensor streamers 20. In various embodiments, vessel 10 may tow any appropriate number of sensor streamers, including as few as none or as many as 26 or more. In marine geophysical acquisition systems such as shown in FIG. 1 that include a plurality of laterally spaced-apart streamers, streamers 20 are typically coupled to towing equipment that secures the forward end of each of streamers 20 at a selected lateral position with respect to adjacent streamers and with respect to vessel 10. For example, as shown in FIG. 1, the towing equipment may include two paravanes 14 coupled to vessel 10 via paravane tow ropes 8. In the illustrated embodiment, paravanes 14 are the outermost components in the streamer spread and may be used to provide lateral streamer separation. Streamers 20 may be steered (laterally and/or vertically) via a plurality of streamer positioning devices (not shown).

Figure 2:
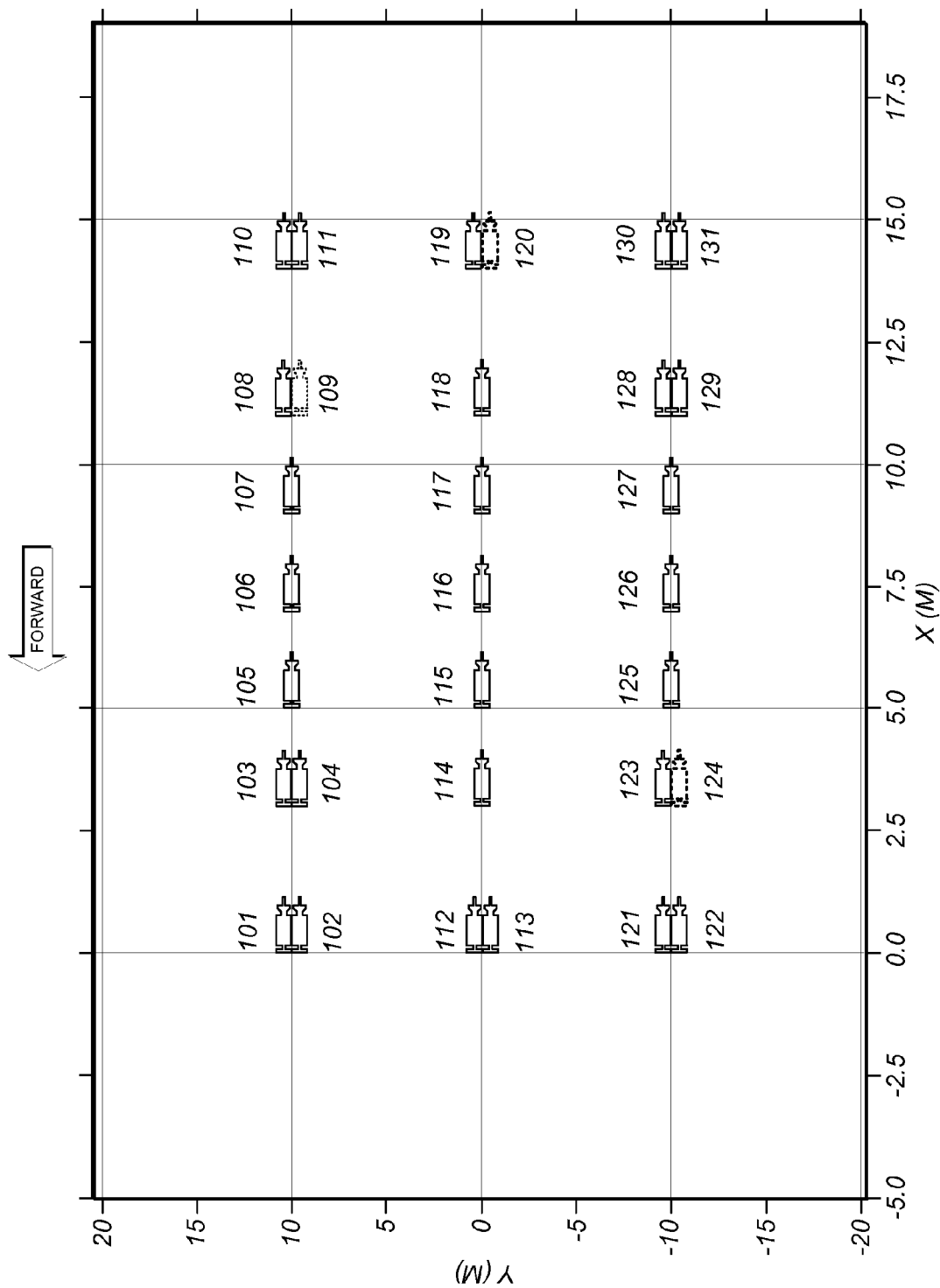
FIG. 2 shows a top view of one array of air guns, including three sub-arrays.

Turning now to FIG. 2, one example of an embodiment of air gun array 32 is shown. In the embodiment of FIG. 2, air gun array 32 is an array of 31 separate air guns, numbered 101-131. These air guns are divided into three separate sub-arrays, respectively shown at positions Y=10 meters, Y=0 meters, and Y=−10 meters. Typically an array of air guns includes on the order of 20-30 air gun positions, although more or fewer may also be used in some embodiments. As shown, arrays may further be split into sub-arrays. For example, an array might typically be split into three sub-arrays, typically 8-10 meters apart.

As shown, some air gun "positions" within an array or sub-array may include more than one air gun (e.g., an air gun position may include an air gun cluster instead of a single air gun). For example, air guns 101 and 102 occupy the same air gun position and may be fired separately or together. Firing two air guns together in a cluster may be used in some embodiments to give a larger effective air gun volume than either air gun provides alone. More than two air guns may also be placed in a cluster according to some embodiments, although this aspect is not shown in FIG. 2. For bubble testing purposes, it may be advantageous to test clusters both individually and as a whole, in order to characterize the performance of the individual air guns as well as the cluster.

Some air gun positions include more than one air gun, but only one active air gun. For example, inactive air guns 109, 120, and 124 are shown in dashed lines. These inactive air guns may be used as spares if the other air guns located in the same positions (e.g., air guns 108, 119, and 123, respectively) fail during a survey. They may also be used in conjunction with their partner in the cluster to replace a failed cluster of the same total volume somewhere else in the array.

As noted above, air guns may have various different nominal volumes. For example, in the embodiment of FIG. 2, the nominal air gun volumes are as shown in Table 1.

TABLE 1

| Air Gun Number | Volume (cubic inches) |
|---|---|
| 101 | 150 |
| 102 | 150 |
| 103 | 60 |
| 104 | 60 |
| 105 | 20 |
| 106 | 40 |
| 107 | 60 |
| 108 | 100 |
| 109 | ~~100~~ |
| 110 | 250 |
| 111 | 250 |
| 112 | 100 |
| 113 | 100 |
| 114 | 90 |
| 115 | 60 |
| 116 | 20 |
| 117 | 40 |
| 118 | 70 |
| 119 | 250 |
| 120 | ~~250~~ |
| 121 | 150 |
| 122 | 150 |
| 123 | 150 |
| 124 | ~~150~~ |
| 125 | 70 |
| 126 | 40 |
| 127 | 20 |
| 128 | 70 |
| 129 | 70 |
| 130 | 250 |
| 131 | 250 |

The embodiment shown in FIG. 2 may be referred to as a "3090 array," because the total volume for all of the air guns (not including the inactive air guns, for which the nominal volume is shown in strikethrough text) adds up to 3,090 cubic inches. During bubble testing according to this disclosure, the inactive air guns may or may not be activated for purposes of testing.

Figure 3:
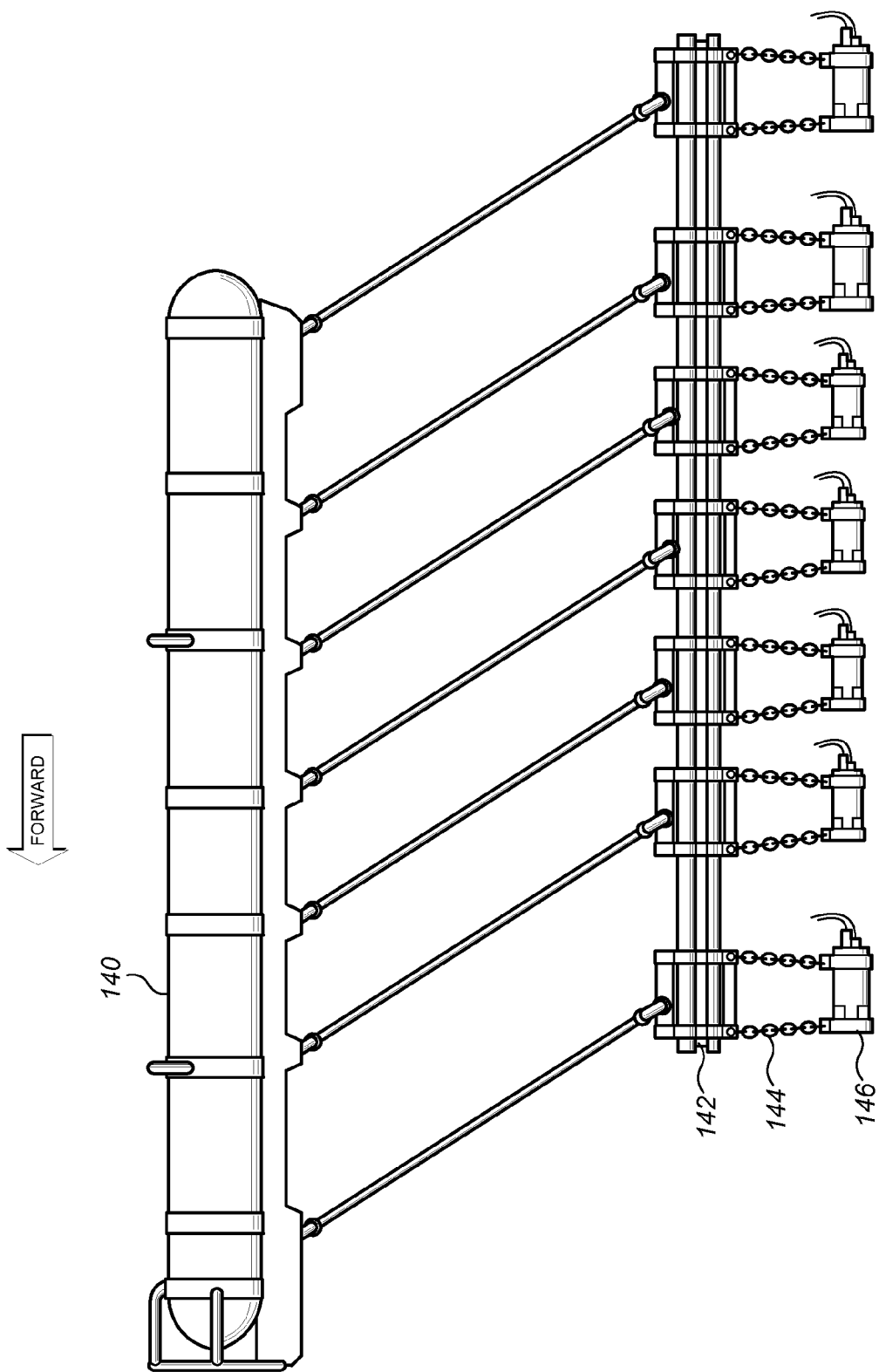
FIG. 3 shows a side view of one sub-array including seven air guns.

Turning now to FIG. 3, a side view of one sub-array of air guns is shown. The sub-array includes float 140, from which a plurality of air guns 146 are suspended. A person of ordinary skill in the art would recognize that other mechanisms, such as remotely operated vehicles or alternative towing configurations, may provide buoyancy for air guns 146 instead of or in addition to float 140. Each air gun 146 is connected via a load-carrying member, such as chains 144, to its corresponding air gun module 142. Typically, each air gun module 142 includes an air gun hydrophone (not shown separately). According to other embodiments, such air gun hydrophones may be placed elsewhere proximate to the air gun. For example, air gun hydrophones may in some embodiments be located at air gun module 142, at float 140, at air guns 146, coupled to chains 144, or any other suitable location. Air gun hydrophones may be located proximate to each individual air gun, each individual air gun location, each air gun sub-array, each air gun array, etc. For example, in some embodiments, air gun hydrophones may be located within 1, 2, 3, 4, 5, 10, 20, or 30 meters of the corresponding air gun.

Regardless of exact position, these air gun hydrophones may be used for purposes of bubble tests. For example, when a particular air gun 146 is fired in a bubble test, the corresponding air gun hydrophone proximate to that air gun may be used to record the characteristics of the acoustic radiation that is produced (e.g., measured bubble period, peak bubble intensity, pressure vs. time, etc.). According to some embodiments, there may be more or fewer air gun hydrophones than air guns. In the embodiment shown in FIG. 3, the air guns are drawn at a constant depth; however, according to other embodiments, they may be drawn at variable depths.

As noted above, bubble tests are currently generally performed only occasionally due to the length of time involved (typically several hours). In accordance with this disclosure, however, substantially the same degree of information as is currently provided by known bubble tests may be obtained, but in seconds (or minutes in some embodiments) rather than hours. This time efficiency may have far-reaching consequences for how the measurements can be used.

Bubble tests, as conducted today, are primarily done only to verify air gun volumes, but not to monitor developments in air gun performance on a regular basis. The methodology of this disclosure may allow more frequent bubble tests (for example, before and/or after every survey line in some embodiments) at minimal cost. In this disclosure, it is to be understood that surveys may not always be arranged in linear orientations. Accordingly, the term "survey line" should be read to encompass various other options for survey paths, such as circular paths, spiral paths, other non-linear paths, etc. Likewise, more frequent bubble tests may be performed at regular intervals during such non-linear surveys, such as, for a circular survey path, each time the survey vessel completes a 360° arc. The data obtained in accordance with this disclosure may allow the performance of the air guns to be monitored, and hence reduce downtime caused by failing air guns, by early detection of potential failures. An air gun that is detected to be near failing may be replaced, for example between survey lines, eliminating or reducing downtime. According to some embodiments, bubble tests may even be performed during a survey line.

By performing bubble tests at the start and end of each survey line, faulty air guns may be detected before the start of a survey line. Air guns that have changed in performance during a survey line can be identified at the end of the survey line, so that they can be maintained during the survey line change if needed. Also, since the time efficient bubble test of this disclosure may only take on the order of one shot record of time to run, the bubble test can even be performed during a survey line if there are questions with regards to the performance of individual air gun(s).

Some key parameters of the air guns that may be monitored with bubble tests in some embodiments include the primary amplitude of the first or subsequent peaks of the air gun's (or air gun cluster's) acoustic signature, the first or subsequent bubble periods (e.g., the characteristic time period that the oscillating air bubble generated by an air gun takes to complete one full oscillation—note that for various physical reasons understood by a person of ordinary skill in the art with the benefit of this disclosure, the bubble period may vary slightly along the length of the acoustic signature), the timing of the air gun with respect to the desired firing aim point (e.g., any deviations or delays between the intended time of actuation and the actual time of actuation), the amplitude and phase spectrum of the air gun's signature, and the variation of any or all of these parameters from bubble test to bubble test. A prime method for detecting failing or faulty air guns is to look for systematic or erratic variations in its acoustic output (e.g., in these key parameters) from bubble test to bubble test.

In order to derive key air gun parameters, such as those described above, it may be advantageous to obtain clean measurements of the individual air guns and air gun clusters of the source array, as fired in isolation. This is because it may be desirable to avoid or reduce contamination of the data by interaction effects caused by other air guns firing nearby, such as acoustic energy originating from nearby air guns, or changes in the physical behavior of the oscillating bubble from one air gun because of the perturbing influence of another air gun fired nearby. In the conventional bubble test, this is achieved by firing one air gun at a time, and for each shot record, recording a length of time similar to what is used in normal seismic acquisition (e.g., typically on the order of 10 seconds). However, as stated before, this is extremely time-consuming. According to some embodiments of this disclosure, all the air guns in the array may be fired in a single shot record (on the order of 10 seconds), but with fire time delays between them, and with the air guns fired in a sequence selected to reduce interaction effects. As used herein, the term "sequence" refers to the order of air gun firings. The firing sequence, as well as the delays may be chosen to ensure that the interaction between consecutive air guns is reduced to an insignificant level and to ensure that the key parameters of the acoustic signatures of the air guns can be measured accurately. The sequence may also be chosen to avoid issues with air in the water from previous air gun firings in the sequence, for example by taking into account the direction of travel of the vessel and/or air guns.

According to some embodiments, all the air guns in a typical source array may to be fired in a time interval of under about 10 seconds. According to other embodiments, they may be fired in time intervals of under 15, 20, 30, 40, 50, or 60 seconds. To improve the statistical validity of the captured data, several firing sequence of this length may be conducted; however, even with several firing sequence, this represents a considerable savings in time compared to current bubble tests, which typically take several hours. This speed-up may be achieved in some embodiments without significantly degrading the quality of the data. For example, some embodiments allow for errors (e.g., contributions from different air guns) to be as low as within 1% of current practice or even lower if desired.

Furthermore, bubble testing according to this disclosure can be carried out simultaneously for two arrays in a dual source configuration, without any significant increase to the errors. As stated above, some embodiments are configured to fire all the air guns and clusters in a sequence (with time delays between the firings), within a time window of 10-20 seconds. Such a firing sequence may be derived according to various considerations, some of which are summarized below.

First, it may be advantageous for the second air gun in any sequence of two air gun firings to be delayed until after the first bubble period of the previous air gun, so that the period of the first air gun can be measured without acoustic contamination from the second air gun. However, it may be even more advantageous for the second air gun in any sequence of two to be fired after the third bubble period of the first air gun, instead of just the first bubble period. This additional delay may further reduce the interaction effects between the two air guns. The bubble period T of the individual air guns may be measured directly or may be estimated using the modified Rayleigh-Willis equation:

$$T = k \frac{P^{1/3} V^{1/3}}{P_{hyd}^{5/6}},$$

where k is a constant that depends on air gun type, P is the pressure of the air released from the air gun, V is the volume of air released from the air gun, and $P_{hyd}$ is the hydrostatic pressure at the depth of the air gun. A typical bubble period for some types of air guns used in seismic surveying may be on the order of approximately 100 milliseconds. As used herein, the term "bubble period" may refer to a measured bubble period, an estimated bubble period (e.g., as estimated by the modified Rayleigh-Willis equation), or a simulated bubble period (e.g., as simulated by a computer modeling program).

Second, the vessel towing the source array may typically be moving forward, such that the air bubbles from the air guns are moving aft-ward (opposite the towing direction) relative to the fired air guns. Normal vessel speed for operations (e.g., 1.5-2.5 m/s or even more) may be used in some embodiments. Accordingly, it may be advantageous for the air guns in a particular sub-array to be fired from the aft to the fore, so that a bubble from an earlier-fired air gun will have an increased separation from later-fired air guns due to the velocity of the vessel through the water. Accordingly, the physical separation between the air bubbles in the water may be increased and/or maximized.

Third, it may be advantageous for air guns to be fired in "rotation" across the physical sub-arrays of the full array. What is meant by this is that, for example, an air gun in sub-array 1 may be followed by an air gun in sub-array 2, which may be followed by an air gun in sub-array 3, which may be followed by an air gun in sub-array 1, etc. This may ensure that the distance between two air guns that are fired consecutively is at least the lateral sub-array separation (which is typically 8-12 meters). For example, if there are 3 sub-arrays with n air guns per sub-array, a possible firing sequence might be: sub-array 1, air gun n; sub-array 2, air gun n; sub-array 3, air gun n; sub-array 1, air gun n-1; sub-array 2, air gun n-1; sub-array 3, air gun n-1; sub-array 1, air gun n-2; etc. The rationale behind this technique is that physical interaction effects between air guns typically reduce with increasing distance between the air guns.

Fourth, if the sub-arrays contain clusters, then more than one pass through each sub-array may be used in some embodiments. For example, on the first pass (working from aft to fore as discussed above) the single air guns and the first air guns in each cluster are fired. On the second pass, the second air guns in each cluster are fired. An alternative embodiment is to fire the air guns in a cluster simultaneously. This allows the cluster performance to be bubble tested as a whole. In some embodiments, cluster air guns may be bubble tested both individually and simultaneously, in order to characterize both the individual air gun performance as well as the performance of the clusters as a whole.

Generally speaking, there are two interactions that may be taken into account when firing two air guns within a short interval. The first interaction is the effect of the previous firing on the present firing, and the second interaction is the effect of the present firing on the previous firing. The primary peak of the present firing may have a profound effect on the signature of the previous firing due its strong amplitude and the relatively weak amplitude of the oscillating bubble from the previous firing. To avoid interference, as noted above, it may be advantageous for the following-up firing to be fired after the arrival of the third bubble oscillation of the previous firing. According to some embodiments, the following-up firing may be fired during the time period between the third and fourth bubble oscillations of the previous firing. According to other embodiments, the following-up firing may be fired some selected time period after the third bubble oscillation. According to various embodiments, it may be advantageous to fire the following-up firing after 1, 2, 3, 4, 5, 6, 7, 8, 9, 10, 15, 20, etc. bubble periods. According to various embodiments, it may be advantageous to fire the following up firing before 3, 4, 5, 10, 15, 20, 25, 30, 40, 50, etc. bubble periods.

According to various embodiments, the interval between each air gun firing may be selected such that the energy of the oscillating bubble is negligible compared to the energy of next firing air gun, at that air gun's position. However, in order to optimize the automated bubble test, all air guns in the array may be tested within the maximum length of the shot record, e.g., about 10 seconds. The air gun firing interval may be selected such that the next air gun fired is some small time margin after the third bubble of the previous air gun, as shown in Table 2. For example, a margin of about 30-35% may be used in some embodiments, or the margin may be selected such that the next air gun firing is fired between the third and fourth bubble periods of the previous air gun firing. According to one embodiment, a simpler firing sequence may be determined based on the bubble period of the largest (as ranked by volume) air gun (or the largest air gun cluster) in the array. In this embodiment, it may be possible to determine a constant delay period—because the constant delay period may be based on the largest air gun (or cluster), it follows that the period should be sufficiently long to account for the smaller air guns as well.

For purposes of this disclosure, the terms "largest air gun" or "largest one of the plurality of air guns" should also be interpreted to encompass the largest air gun cluster in the array. For example, if an array includes one or more air gun clusters, and one of these clusters has a larger total effective volume than any individual air gun in the array, then that cluster would be considered the "largest air gun." In an embodiment in which two or more air guns (or clusters) in an array are of the same largest volume, then the terms "largest air gun" and "largest one of the plurality of air guns" should be interpreted to refer to any of the two or more.

Another embodiment involves firing some of the air guns at the same time. Generally, firing the air guns simultaneously may be advantageous in embodiments where smaller air guns (e.g., about 20-40 cubic inches or smaller) are used, or where there is a relatively large (compared to the size of the air guns) separation between the air guns.

One example of arrival times $T_3$ of the third bubble oscillation for different sized air guns, as well as suggested shot intervals based on $T_3$ is presented in Table 2. What is meant by the term "suggested shot interval" in this context is a suggested delay period to wait after the firing of a first air gun of a given size before firing the next air gun.

TABLE 2

| Volume (cu. in) | $T_3$ (ms) | Suggested shot interval (ms) |
|---|---|---|
| 20 | 161.8 | 210 |
| 40 | 182.5 | 240 |
| 60 | 207.8 | 270 |
| 70 | 218.1 | 290 |
| 90 | 236.0 | 310 |
| 100 | 241.1 | 320 |
| 150 | 274.3 | 360 |
| 250 | 322.9 | 430 |

Figure 4:
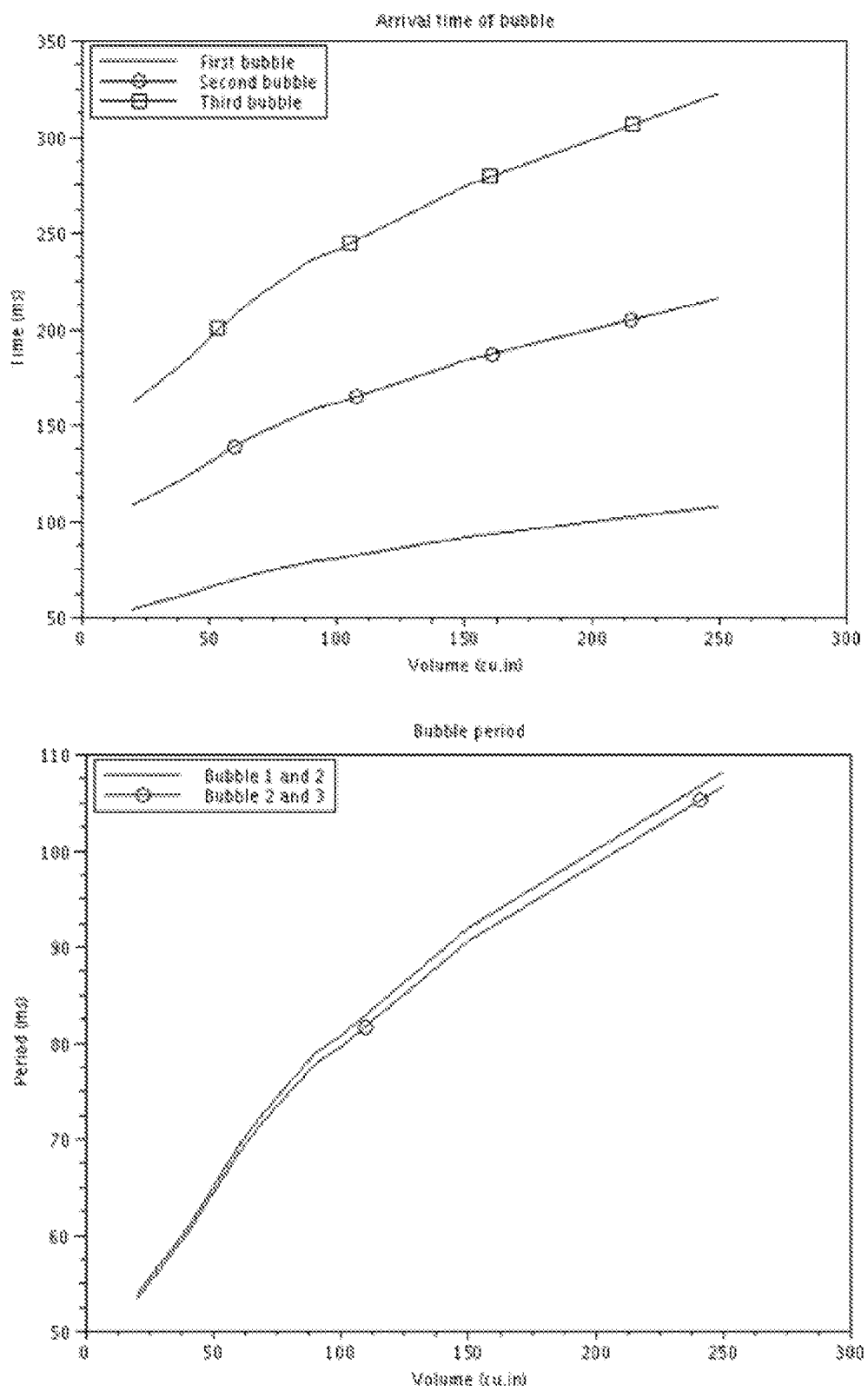
FIG. 4 shows graphs depicting bubble characteristics as a function of air gun volume.

Turning now to FIG. 4, a graph is shown depicting the arrival times of the first, second, and third bubbles, as well as the corresponding bubble periods, as a function of the air gun volume. (As shown, the measured bubble period between the first and second bubble may not be exactly the same as the period between the second and third bubble. The term "bubble period" may refer to either of these measured periods, or their average, or any other suitable estimation of the period of oscillation of the bubble.)

Figure 5:
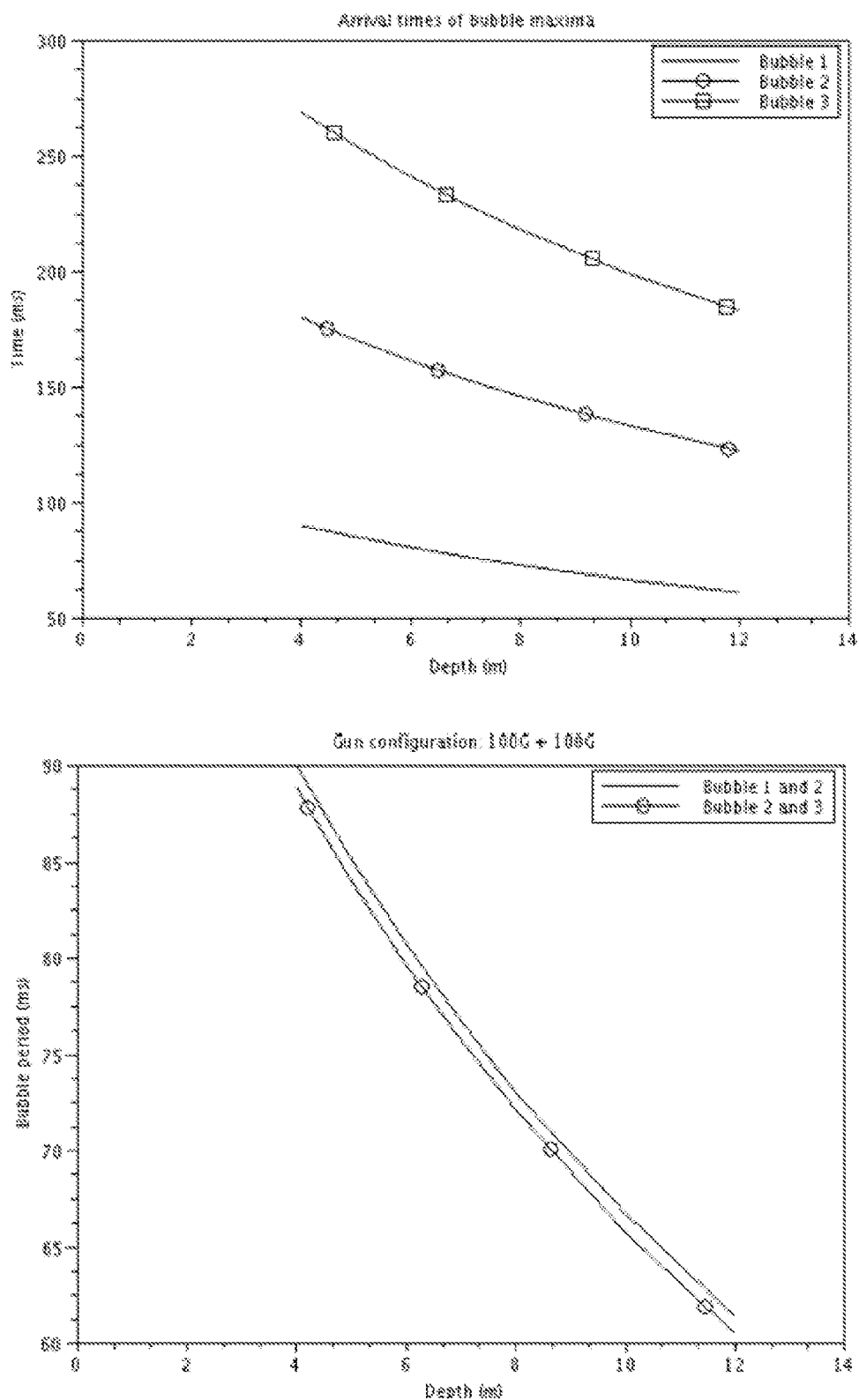
FIG. 5 shows graphs depicting bubble characteristics as a function of depth.

Turning now to FIG. 5 (and also with reference to the modified Rayleigh-Willis equation described above), it may be seen that the bubble period typically depends not only on the air gun volume, but also on the hydrostatic pressure (which is related to the depth). FIG. 5 shows arrival times of the first, second, and third bubble, as well as the corresponding bubble period, as a function of the air gun depth. In order to verify that the determined shot intervals are still valid when air guns are firing at depths other than the typical 6.0 meters, FIG. 5 demonstrates that typically with increasing depth, the bubble period becomes shorter. Hence, the suggested shot intervals may still be considered valid for sources located deeper than 6.0 meters.

For shallower sources, on the other hand, the period typically increases; however, the increase is typically not so large as to invalidate the suggested shot interval times. At about 4 meters source depth, for example, the arrival of the third bubble is still within the suggested shot interval. Typically, it may be considered unusual that sources shallower than 4 meters deep are deployed. Accordingly, the suggested shot intervals may be considered valid for most typical depths.

In some embodiments, there is relatively limited time available for delay between each air gun firing, and it may thus be unlikely that energy of bubble would have diminished sufficiently based solely on the timing intervals between firing any pair of air guns. Because the amount of energy measured at an air gun hydrophone depends on the distance from the air gun hydrophone to the oscillating bubble, it may be advantageous to also take into account air gun distances in determining a firing sequence.

Figure 6:
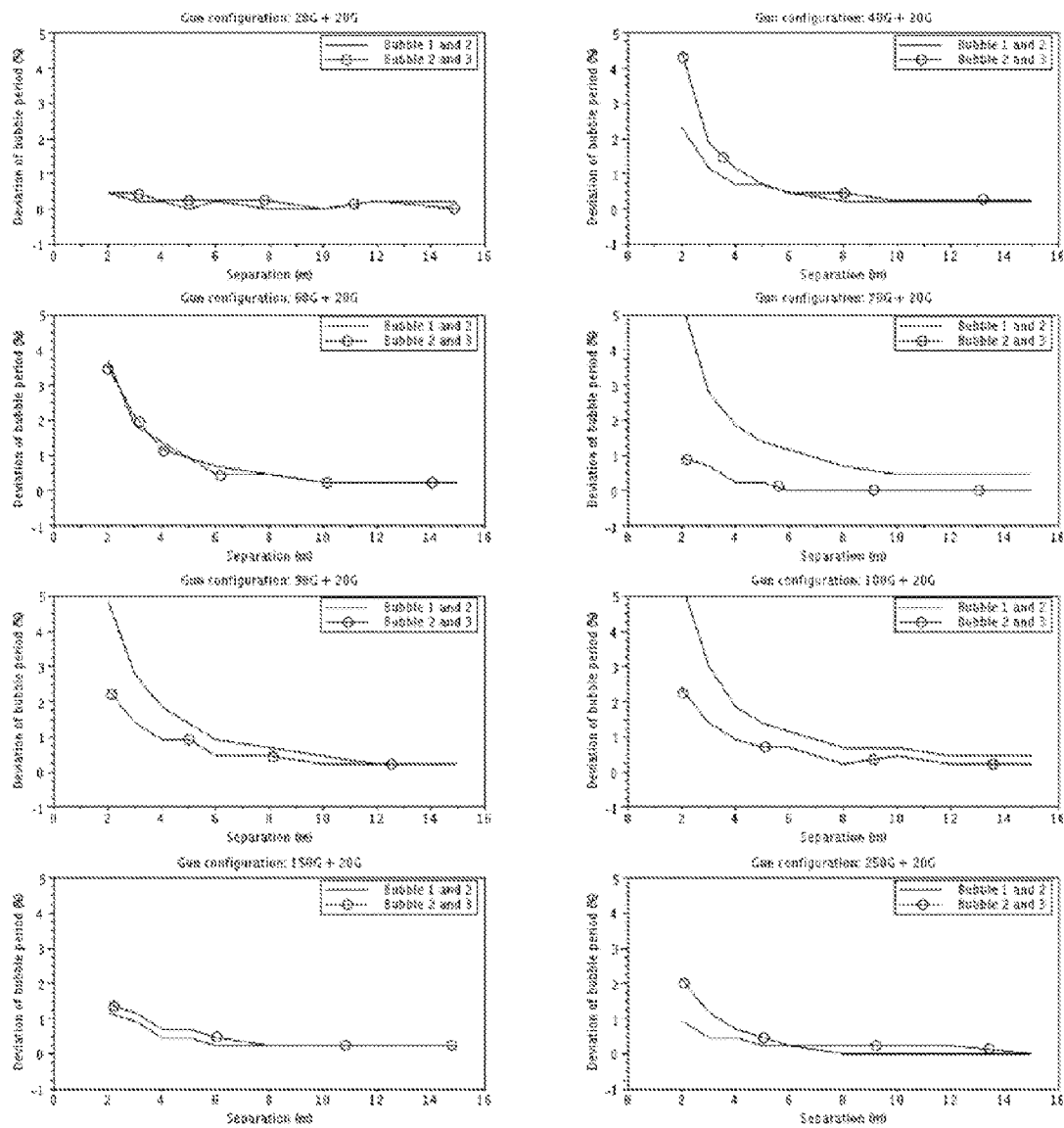
FIGS. 6-11 show graphs depicting deviations in bubble period when various pairs of air guns are fired in succession, as a function of air gun separation.
Figure 7:
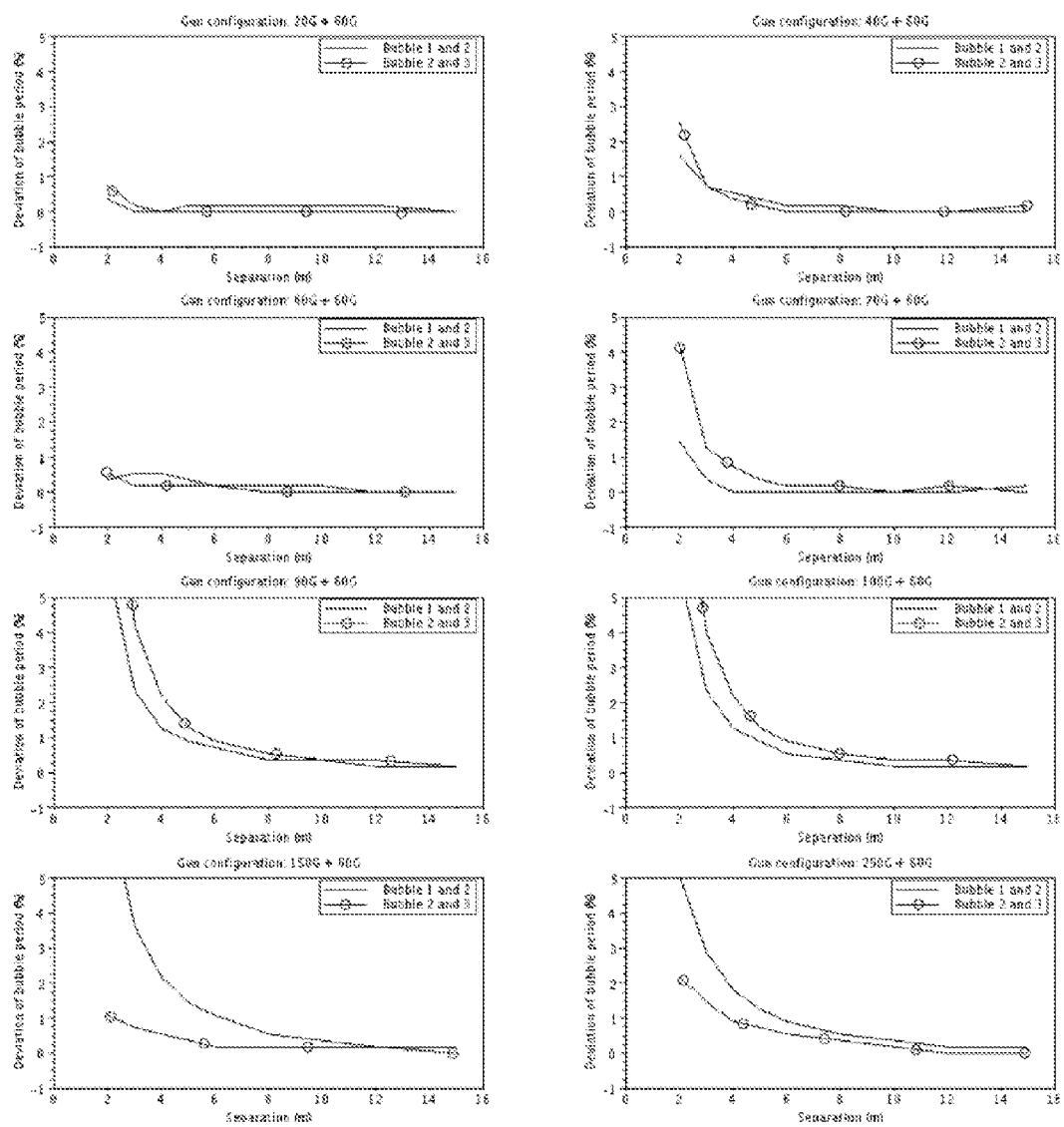
Figure 8:
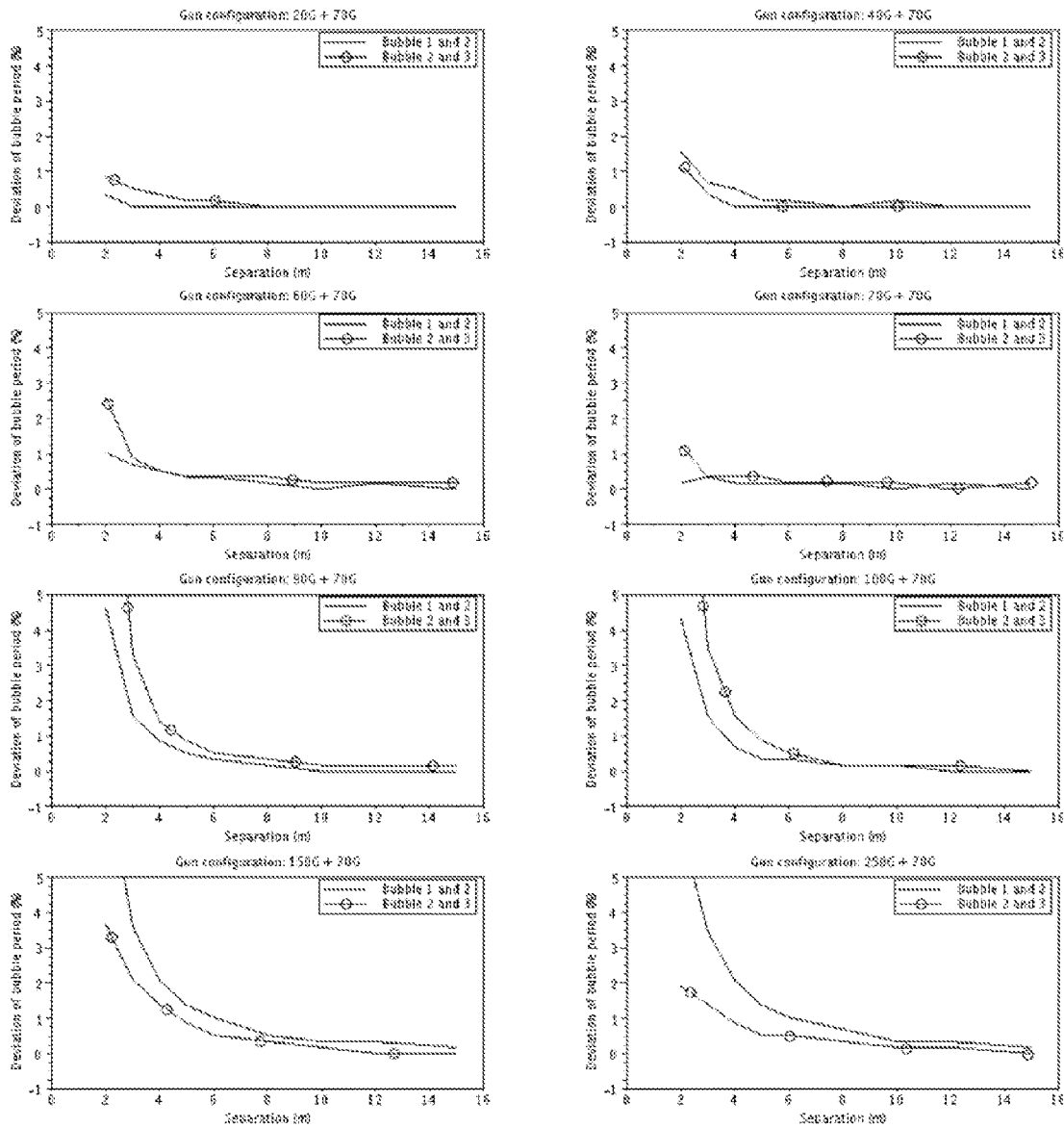
Figure 9:
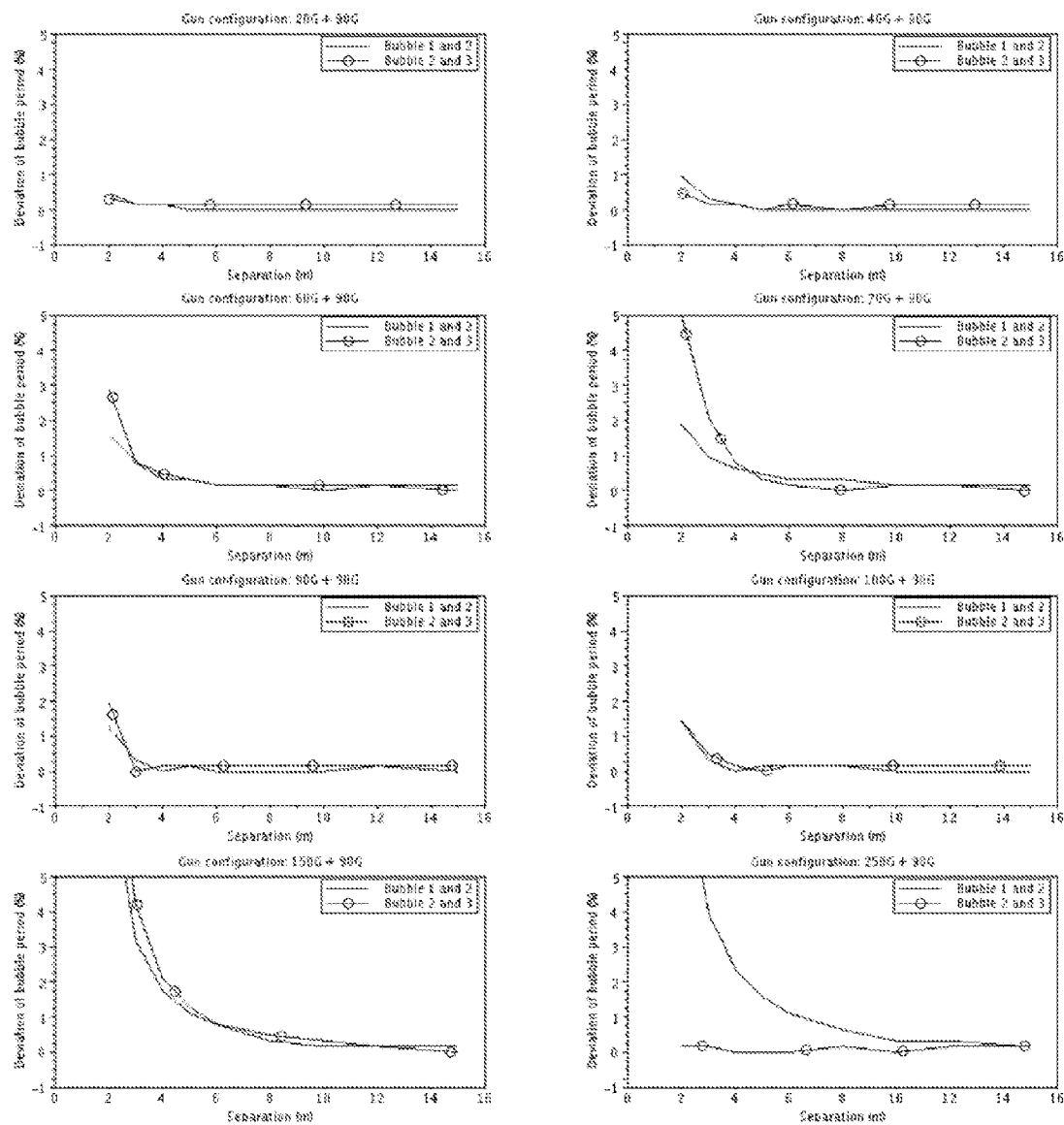
Figure 10:
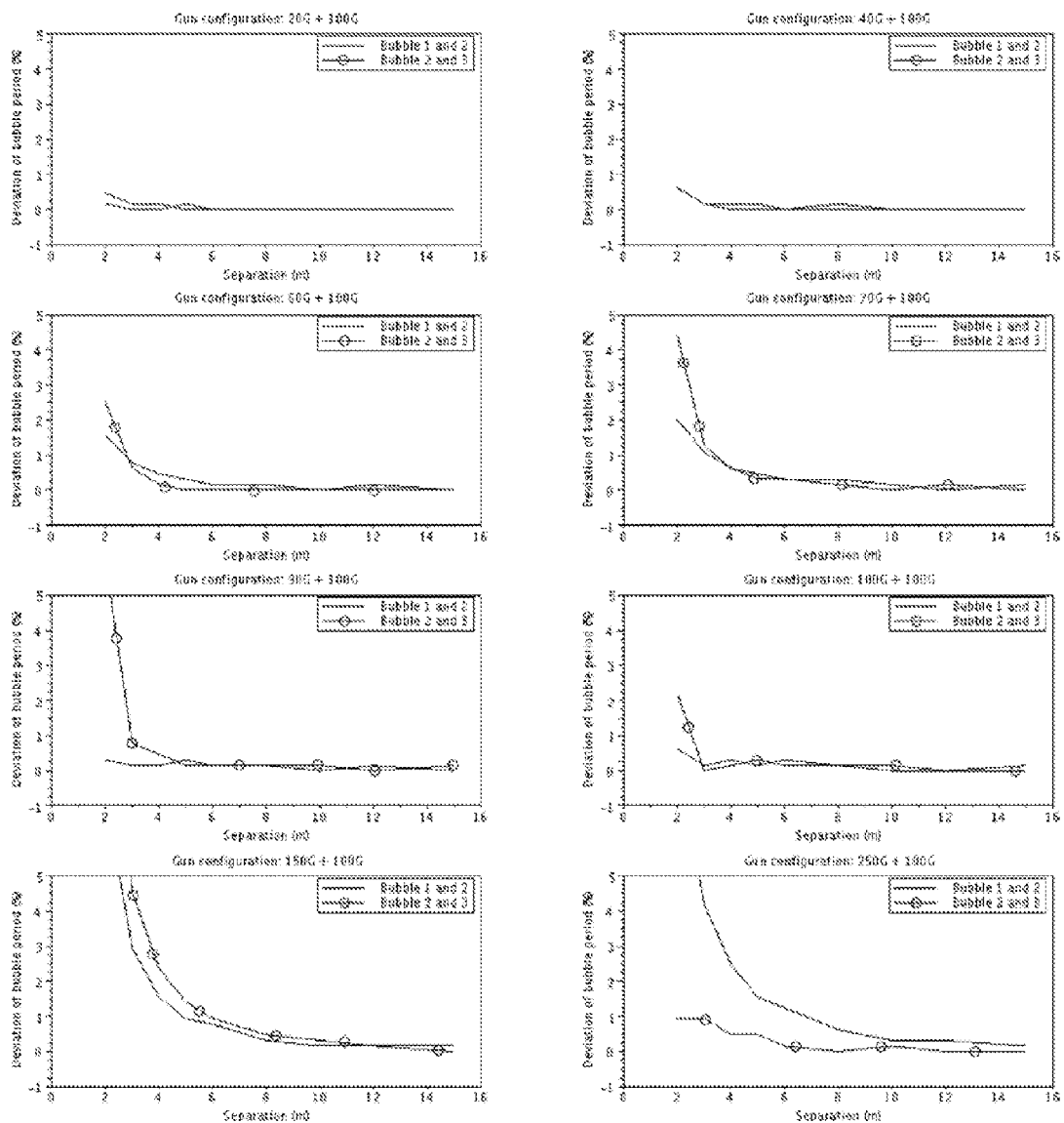
Figure 11:
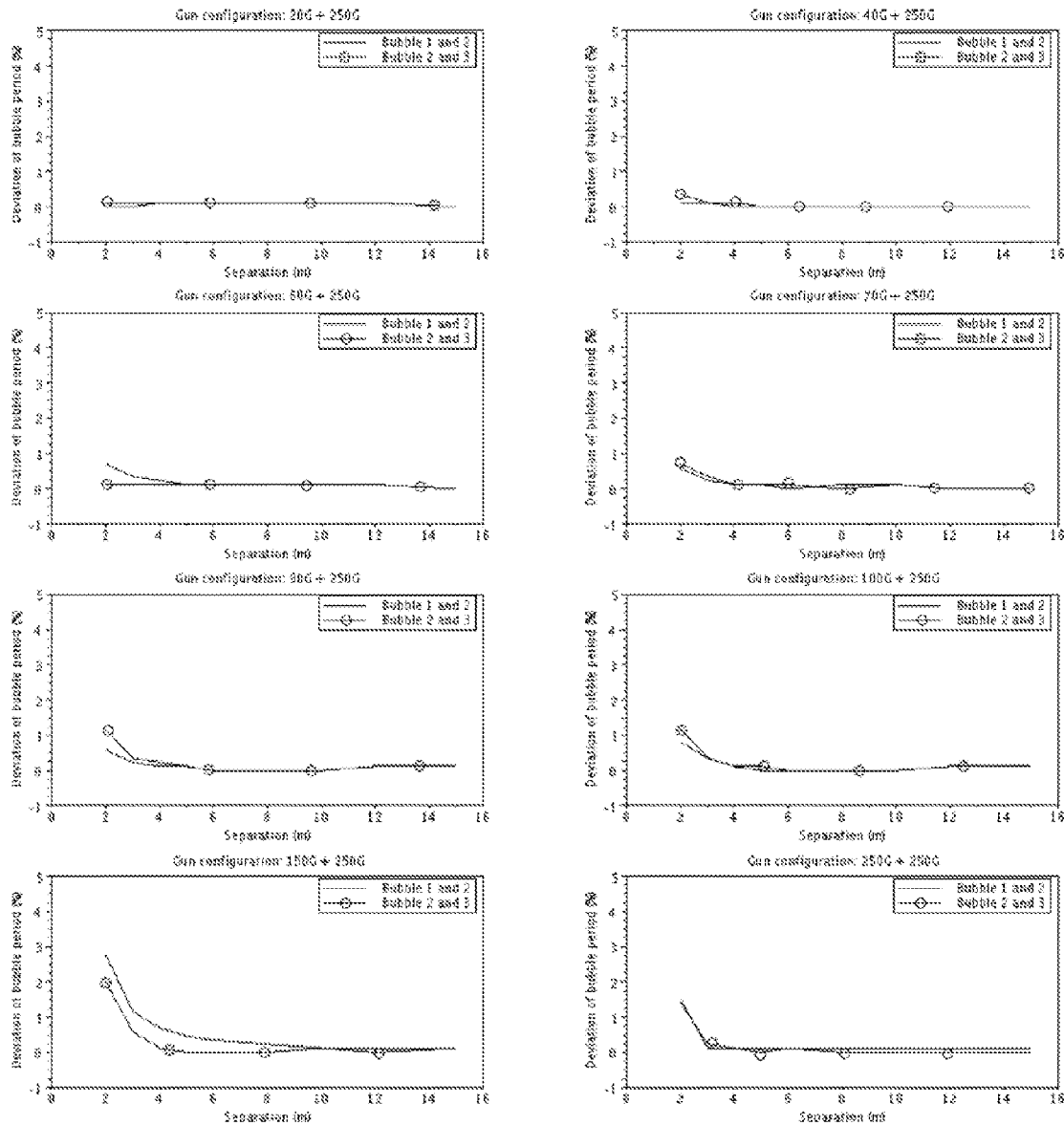

Turning now to FIGS. 6-11, graphs are presented depicting the interactions between air guns of different volumes, as a function of distance. Using the suggested air gun firing intervals shown in Table 2 for the second air gun in each pair, all possible air gun combinations (among a set of common air gun sizes) are shown. Each combination consists of two air guns with the second air gun firing after the first air gun with an air gun separation of 2 meters to 15 meters. The various graphs in FIGS. 6-11 show the deviation in the measured bubble period of the second air gun, based on the interaction effect of the first air gun. For example, the top left graph of FIG. 6 shows a 20G (i.e., 20 cubic inches) air gun firing after another 20G air gun at varying distances; the top right graph of FIG. 6 shows a 20G air gun firing after a 40G air gun; etc.

These figures show that with increasing air gun separations, the bubble periods typically deviate less from the bubble periods of the reference cases. In general, with increasing air gun volume of the first firing air gun, the deviation increases. However, it may be seen that in some cases (e.g., where the first air gun has a volume of about 150 or 250 cubic inches), the deviation is actually smaller than for the cases where the first air gun has a volume of less than that. This may be a result of the amplitude of the oscillating bubble becoming smaller.

According to various embodiments, different levels of interaction (contribution from other air guns) in the measured acoustic signatures may be considered acceptable. For example, in some embodiments, it may be desirable to keep contributions to a level of 1% or less. (That is, when performing a bubble test on a particular air gun, it may be desirable to keep the measured acoustic signatures of other guns to a level of 1% or less, relative to the acoustic signature of the particular air gun.) In other embodiments, 0.1%, 0.5%, 2%, 3%, 5%, 10%, 20%, etc. may all be considered acceptable contribution levels. "Acoustic signature" is used herein to refer to various aspects of the air guns measured during bubble testing, for example: measured bubble period, measured air gun volume, peak bubble intensity, pressure vs. time, etc.

Assuming, for example, that deviations of less than 1% are acceptable (e.g., a measured bubble period being within 1% of the actual value), it may be seen from FIGS. 6-11 that it may be advantageous for small air guns not to be fired directly after large air guns. For example, it may not be ideal for a 20 cubic inch air gun to be fired directly after a 150 cubic inch air gun, unless the distance between the air guns is sufficiently large.

Figure 12:
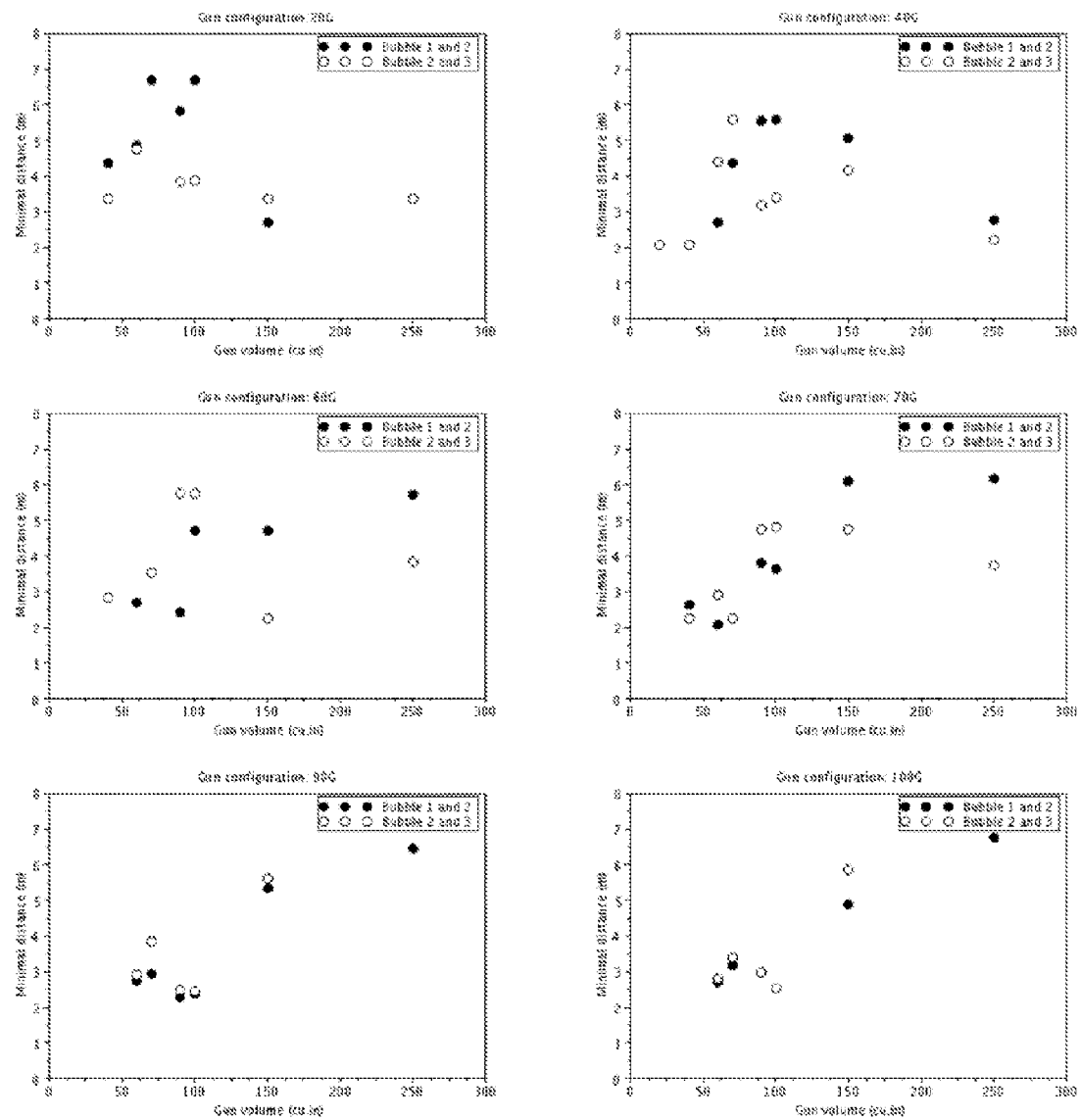
FIG. 12 shows graphs depicting acceptable distances, according to one embodiment, for various sizes of air guns.

Turning now to FIG. 12, graphs are presented showing the minimum distances according to this embodiment between the air guns, in order to avoid interaction contributions larger than 1% in the measured bubble periods. For example, the top left graph in FIG. 12 shows the interaction effect in an air gun of 20 cubic inches that is fired after an air gun having size that varies along the horizontal axis. As may be seen, the largest interaction occurs when the first air gun in the sequence has a volume of approximately 75-100 cubic inches. In that situation, a separation of approximately 7 meters is sufficient to reduce the interaction effect to below 1%. As may be seen from the graphs in FIG. 12, in all cases shown, an air gun separation of 8 meters is sufficient to reduce the interaction to this level.

The minimal acceptable distance between two air guns in order to be within a certain interaction contribution margin may depend on the air gun volumes and on the time delay between the shots. For bubble tests performed on a moving vessel, the vessel and the air guns may be moving forward. Accordingly, the bubbles are moving aft-wards, relative to the air guns and air gun hydrophones. This aft-ward motion not only affects the minimal distance, but it also may be the case that interaction between an existing bubble and the bubble from an air gun fired later from an air gun farther toward the aft of the array may occur. Therefore, the vessel speed has an effect on the location of the bubble in the array and may be taken into account when determining the firing sequence and delays.

This may be addressed by firing the air guns in the aft first in some embodiments. After these air guns are fired (for example, rotating through sub-arrays as discussed above), the air guns immediately in fore of the aft air guns may be fired, and so on. This may also have the benefit that small air guns are typically not fired directly after a big air gun.

Generally, the time and distance between the shots is sufficient that interaction is minimal. Firing an air gun located at a different sub-array after the previous air gun ensures that the suggested minimal separation is attained. It may be advantageous for the sub-array separation to be monitored during the firing sequence to ensure that each air gun separation is at least 8 meters. Sub-array separations lower than, for example, 6 meters may lead to contributions from other air guns that are larger than 1%.

Although the air gun source typically moves forward, and the corresponding air bubble moves relatively aft-wards, the bubble typically has not moved very far after a short interval. Accordingly, interaction might occur when firing the second air gun of a cluster after the first air gun in the cluster (e.g., the situation where the first and second air guns of the cluster are at the same air gun position). To avoid interaction of the air guns in a cluster, it may therefore be advantageous to delay firing second air gun in each cluster until after all the single air guns and the first air gun in the cluster have been fired.

In accordance with these considerations, one pass of bubble testing may be performed through the entire array, with the air guns in the aft fired first, and the sequence rotating through sub-arrays and proceeding forward. Then the second air guns in the clusters may be fired in a second pass through the array after all the single air guns and the first air gun in the clusters are fired. An embodiment of such a sequence may be found in Table 3. The air gun numbers correspond to the numbering in FIG. 2. With reference back to FIG. 2, it may be seen that the suggested firing sequence includes rotating through the various sub-arrays while proceeding from the aft to the fore, and then firing the second air guns in each cluster, again rotating through sub-arrays and proceeding from aft to fore.

TABLE 3

| Air gun nr. | Volume (cu. in) | Shot time (ms) |
|---|---|---|
| 131 | 250 | 50 |
| 120 | 250 | 480 |
| 111 | 250 | 910 |
| 129 | 250 | 1340 |
| 118 | 250 | 1630 |
| 109 | 250 | 1920 |
| 127 | 70 | 2240 |
| 117 | 70 | 2450 |
| 107 | 100 | 2690 |
| 126 | 70 | 2960 |
| 116 | 100 | 3200 |
| 106 | 20 | 3410 |
| 125 | 40 | 3650 |
| 115 | 60 | 3940 |
| 105 | 40 | 4210 |
| 124 | 20 | 4420 |
| 114 | 40 | 4780 |
| 104 | 70 | 5090 |
| 122 | 60 | 5360 |
| 113 | 20 | 5720 |
| 102 | 150 | 6040 |
| 130 | 90 | 6400 |
| 119 | 60 | 6830 |
| 110 | 150 | 7260 |
| 128 | 60 | 7690 |
| 108 | 150 | 7980 |
| 123 | 100 | 8300 |
| 103 | 150 | 8660 |
| 121 | 150 | 8930 |
| 112 | 100 | 9290 |
| 101 | 150 | 9610 |

As can be seen in Table 3, a delay of about 50 ms between the start of the record and firing the first air gun may be used in some embodiments. In Table 4, the expected arrival times of each local maximum is shown. Note that the 3rd bubble maximum for the final air gun in this example arrives within about 10 seconds at 9,884 ms.

TABLE 4

| Air gun nr. | Expected bubble peak arrivals (ms) | | |
|---|---|---|---|
| | First | Second | Third |
| 131 | 158 | 266 | 373 |
| 120 | 588 | 696 | 803 |
| 111 | 1018 | 1126 | 1233 |
| 129 | 1413 | 1486 | 1558 |
| 118 | 1703 | 1776 | 1848 |
| 109 | 2001 | 2082 | 2161 |
| 127 | 2295 | 2348 | 2402 |
| 117 | 2512 | 2572 | 2633 |
| 107 | 2760 | 2829 | 2898 |
| 126 | 3022 | 3082 | 3143 |
| 116 | 3255 | 3308 | 3362 |
| 106 | 3472 | 3532 | 3593 |
| 125 | 3723 | 3796 | 3868 |
| 115 | 4010 | 4079 | 4148 |
| 105 | 4265 | 4318 | 4372 |
| 124 | 4512 | 4604 | 4694 |
| 114 | 4859 | 4938 | 5016 |
| 104 | 5160 | 5229 | 5298 |
| 122 | 5452 | 5544 | 5634 |
| 113 | 5801 | 5882 | 5961 |
| 102 | 6132 | 6224 | 6314 |
| 130 | 6508 | 6616 | 6723 |
| 119 | 6938 | 7046 | 7153 |
| 110 | 7368 | 7476 | 7583 |
| 128 | 7763 | 7836 | 7908 |
| 108 | 8061 | 8142 | 8221 |
| 123 | 8392 | 8484 | 8574 |
| 103 | 8730 | 8799 | 8868 |
| 121 | 9022 | 9114 | 9204 |
| 112 | 9371 | 9452 | 9531 |
| 101 | 9702 | 9794 | 9884 |

In some embodiments, a seismic survey may use flip-flop shooting with two arrays, in order to allow one air gun array to be recharged while the other shoots. Typically this method uses two source arrays, which may be about 50 meters apart (for example, each laterally spaced 25 m from the centerline). In various embodiments, they may be other lateral distances apart, such as 25 meters, 37.5 meters, 75 meters, etc. According to some embodiments, firing two air guns at the same time with more than 15 meters lateral separation may typically result in bubble period deviations of less than 0.5%. Accordingly, it may be possible in some embodiments to shoot the firing sequence simultaneously in two or more arrays without any significant increase in the error. This means that the firing sequence for the bubble tests of a dual source can be as efficient as the bubble test of a single source according to this embodiment.

Figure 13:
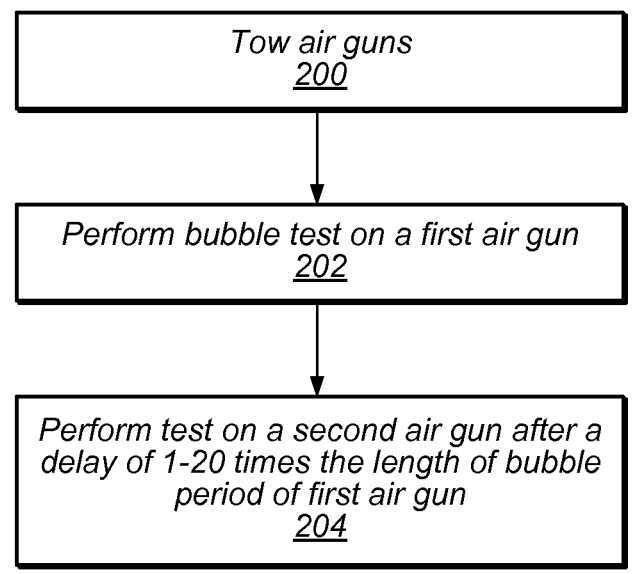
FIG. 13 shows a process flow according to an embodiment of this disclosure.

Turning now to FIG. 13, an exemplary process flow according to one embodiment of this disclosure is presented. Flow begins at block 200.

At block 200, a plurality of air guns (e.g., two or more air guns) are towed through the water. The air guns may be arranged in various manners. For example, they may be arranged in an array. Such an array may further be broken down into a plurality of sub-arrays in some embodiments. For example, an array may include three separate sub-arrays. Flow proceeds to block 202.

At block 202, a bubble test is performed on a first one of the air guns being towed. In some embodiments, the bubble test involves actuating (e.g., firing) the first air gun and measuring the response. For example, the air gun may include an air gun hydrophone thereon or located proximate thereto. Such an air gun hydrophone may be used to measure various characteristics of the firing, such as bubble period and air gun volume. Flow proceeds to block 204.

At block 204, a bubble test is performed on a second one of the air guns being towed. This bubble test is performed with a delay relative to the first bubble test. This delay may be based on a bubble period for the first air gun. For example, it may be between one and twenty times as long as the bubble period for the first air gun. In some embodiments, the delay may be at least as long as two times the bubble period and at most as long as ten times the bubble period. In other embodiments, it may be at least as long as three times the bubble period. In yet other embodiments, it may be at most as long as ten times the bubble period. In still other embodiments, it may be at least as long as three times the bubble period and at most as long as four times the bubble period. As discussed above, various considerations may be used in determining the delay.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
towing a plurality of air guns behind a vessel in a body of water, wherein a largest one of the plurality of air guns has an associated bubble period;
performing a bubble test on a first air gun of the plurality of air guns, wherein performing the bubble test on the first air gun includes firing the first air gun at a first time; and
performing a bubble test on a second air gun of the plurality of air guns, wherein performing the bubble test on the second air gun includes firing the second air gun at a second, later time;
wherein a delay between the first time and the second time is at least as long as the bubble period and at most as long as twenty times the bubble period.

2. The method of claim 1, wherein the delay between the first time and the second time is three times as long as the bubble period plus a selected margin.

3. The method of claim 2, wherein the delay between the first time and the second time is between three and four times as long as the bubble period.

4. The method of claim 1, further comprising performing bubble tests on each air gun in the plurality of air guns in a sequence, wherein delays between each consecutive pair of firings in the sequence are at least as long as a bubble period for the earlier of the two air guns in the sequence and at most as long as twenty times the bubble period for the later of the two air guns in the sequence.

5. The method of claim 4, wherein the sequence begins at an aft-most one of the plurality of air guns.

6. The method of claim 5, wherein the sequence ends at a forward-most one of the plurality of air guns.

7. The method of claim 4, wherein the plurality of air guns includes at least 30 air guns, and wherein a total time for the sequence is at most 20 seconds.

8. The method of claim 4, wherein the delays between each consecutive pair of firings in the sequence are at least as long as the bubble period.

9. A method, comprising:
   in a seismic survey, performing a bubble test on a plurality of seismic air guns in a body of water, wherein the bubble test includes:
      beginning a shot record by initiating data recording at a sensor;
      during the shot record, firing at least two of the plurality of seismic air guns in a sequence with a firing time delay between firing a first of the at least two of the plurality of seismic air guns and a second of the at least two of the plurality of seismic air guns; and
      after firing the second of the at least two of the plurality of seismic air guns, ending the shot record by stopping the data recording at the sensor.

10. The method of claim 9, wherein the bubble test is performed during a survey line of the seismic survey.

11. The method of claim 9, wherein the bubble test is performed between survey lines of the seismic survey.

12. The method of claim 9, wherein the shot record is at most 10 seconds.

13. The method of claim 12, wherein the bubble test includes firing all of the plurality of seismic air guns during the shot record.

14. The method of claim 13, wherein the plurality of seismic air guns includes at least 20 seismic air guns.

15. A system, comprising:
   an air gun control apparatus; and
   an air gun interface, wherein the air gun control apparatus is coupleable to a plurality of air guns via the air gun interface;
   wherein the air gun control apparatus is configured to cause, via the air gun interface, the plurality of air guns to perform corresponding bubble tests in a sequence;
   wherein the sequence includes delays between each consecutive pair of air guns in the sequence, the earlier air gun in each consecutive pair having a corresponding bubble period; and
   wherein the delay for each consecutive pair is at least as long as the corresponding bubble period and at most as long as twenty times the corresponding bubble period.

16. The system of claim 15, further comprising at least one communications medium operable to couple the air gun interface to the plurality of air guns.

17. The system of claim 16, further comprising the plurality of air guns.

18. The system of claim 17, wherein each of the plurality of air guns includes a corresponding air gun hydrophone located proximate thereto.

19. The system of claim 15, wherein the delays for each consecutive pair of bubble tests are at least as long as three times the corresponding bubble period and at most as long as five times the corresponding bubble period.

20. The system of claim 15, wherein the plurality of air guns are arranged in a plurality of sub-arrays, and wherein the sequence includes rotation between the plurality of sub-arrays such that each consecutive pair of air guns in the sequence spans two sub-arrays.

21. The system of claim 20, wherein the sequence further includes a progression from an aft-most portion of the plurality of air guns to a forward-most portion of the plurality of air guns.

* * * * *